A. H. ACKEN.
Rotary Harrow.
No. 64,055.
Patented Apr. 23, 1867.
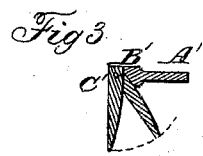
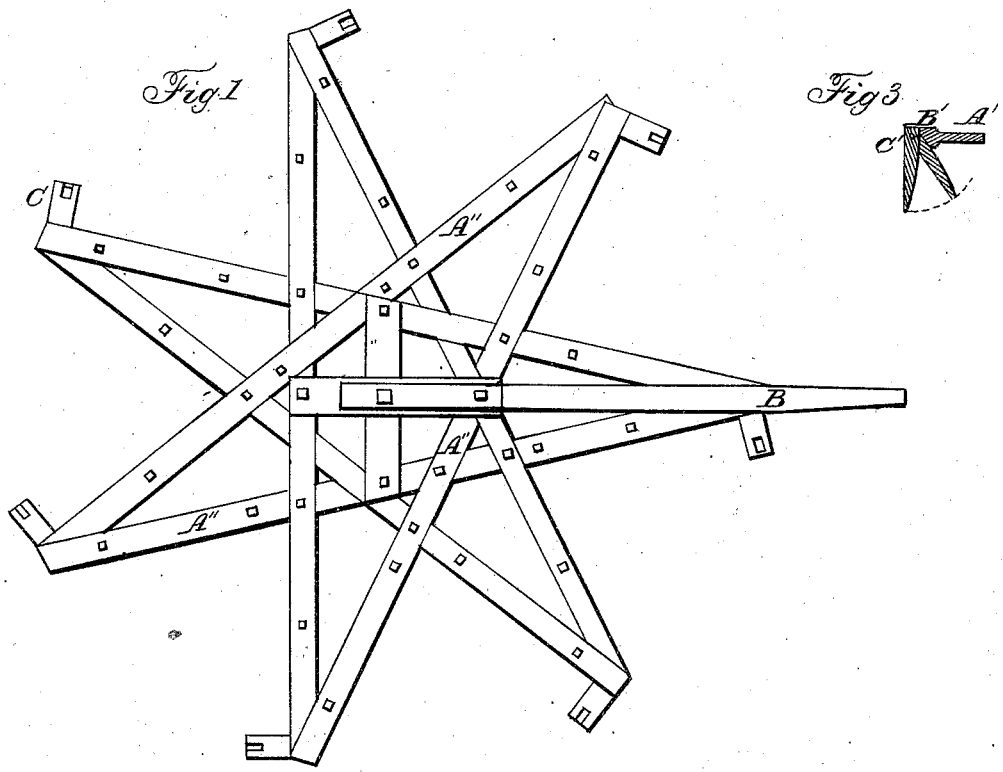
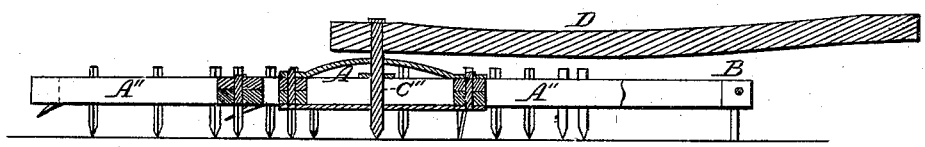

United States Patent Office.

ALBERT H. ACKEN, OF GRIGGSTOWN, NEW JERSEY.

Letters Patent No. 64,055, dated April 23, 1867.

---

IMPROVEMENT IN ROTARY HARROW.

---

The Schedule referred to in these Letters Patent and making part of the same.

---

TO ALL WHOM IT MAY CONCERN:

Be it known that I, ALBERT H. ACKEN, of Griggstown, township of Franklin, county of Somerset, and State of New Jersey, have invented a new and useful Improvement on the Rotary Harrow; and I do hereby declare that the following is a full and exact description thereof, reference being had to the accompanying drawing, and to the letters of reference marked thereon.

The nature of my invention consists in providing the outer points of the rotary harrow with a jointed tooth, causing continual rotation, being assisted by the draught from a centre bolt, instead of the present appliance of the rotary harrow.

To enable others skilled in the art to make and use my invention, I will proceed to describe its construction and operation.

I construct my harrow in a seven-pointed or star shape, and apply thereto a jointed tooth to the extreme points, in connection with a single bolt for centre draught. In order to make rotation perfect, I draw from a bolt through a beam, and passing through three iron plates crossing the open space in centre of harrow. The top plate I raise or spring up in order to give the bolt a longer and steadier draught, as shown at A in the accompanying drawing; while the jointed tooth, at the extreme points, after passing the beam at B, causes continual rotation while the harrow is in motion, and the joint releasing itself from offset at C, and so continuing until passing around to B, where it again takes effect, keeping up the aforesaid rotation, which none of the previous rotary harrows have accomplished. (The outer tooth of which being a cultivator tooth, and depending simply on the one going backward and the other forward for rotation, with a wheel inside a circle at the point of draught, which pivot is insufficiently acute to cause perfect rotation.) The jointed tooth, as will be seen by the accompanying drawings, is forged of sufficient dimensions at A', while the other end being left sufficiently large at B' to cut a rabbet for the insertion of the tooth C', while a bolt passing through the rabbeted shank B', and through the head of tooth C', making a joint; the under part of B' being bevelled back sufficient to admit of the tooth C' rising from its work while passing round from C to B, where it again drops and takes effect.

What I claim as my improvement, and desire to secure by Letters Patent, is—

The frame A'', when constructed as described, in combination with the jointed teeth B', centre-pin C'', and draught-rod D, all arranged and operating as specified.

ALBERT H. ACKEN.

Witnesses:
    TH. C. CONNCLLY,
    ALEX. MAHON.